(No Model.)
R. KNIETSCH.
PACKAGE OF LIQUID CHLORIN.
No. 506,640.   Patented Oct. 10, 1893.
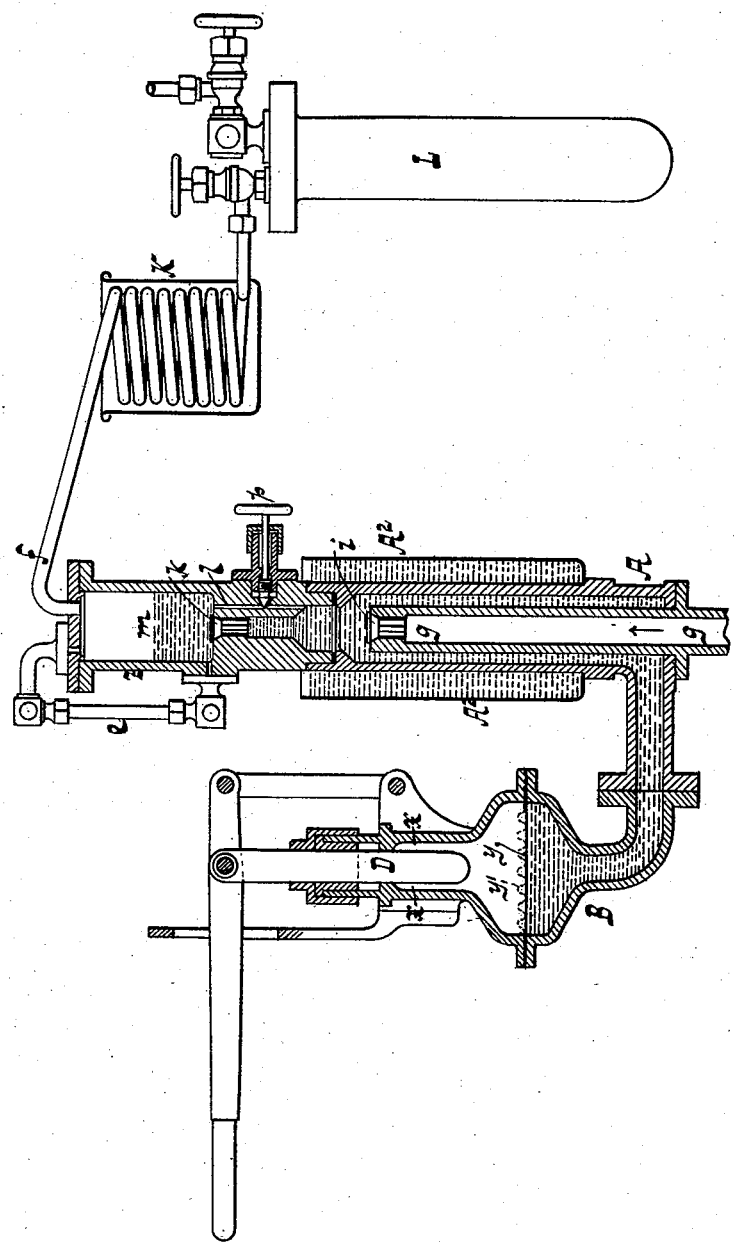
WITNESSES:
William L Miller
Edward Wolff
INVENTOR:
Rudolph Knietsch
BY
Van Santvoord & Hauff
ATTORNEYS.

UNITED STATES PATENT OFFICE.

RUDOLPH KNIETSCH, OF LUDWIGSHAFEN, GERMANY, ASSIGNOR TO THE BADISCHE ANILIN AND SODA FABRIK, OF SAME PLACE.

PACKAGE OF LIQUID CHLORINE.

SPECIFICATION forming part of Letters Patent No. 506,640, dated October 10, 1893.

Application filed September 12, 1892. Serial No. 445,702. (No specimens.)

*To all whom it may concern:*

Be it known that I, RUDOLPH KNIETSCH, doctor of philosophy, a subject of the King of Prussia, residing at Ludwigshafen-on-the-Rhine, in the Kingdom of Bavaria and Empire of Germany, have invented new and useful Improvements in Chlorine as an Article of Manufacture, of which the following is a specification.

My invention consists of chlorin in a liquid state so constituted that it may be handled in large quantities with convenience and safety as an article of commerce.

I have succeeded in producing and isolating liquid chlorin and I have discovered that when isolated and therefore substantially dry it does not attack certain of the principal metals as hereinafter explained, even when left in contact with them for prolonged periods; I have discovered a process by which it can be produced for practical purposes. I have discovered an apparatus to effectuate such process. I have transported this liquid chlorin for commercial purposes in large quantities in metallic vessels, and it is in use by ordinary workmen in the ordinary course of manufacture.

The process and apparatus are the subject of a separate application numbered 354,412, filed June 5, 1890, and are therefore, not claimed herein.

I will, as a matter of convenience, describe an example of my process and apparatus at the same time, having reference to the accompanying drawing which represents an elevation of the apparatus partly in section, but I do not wish to be limited to the details of this description.

The apparatus consists of two vessels A and B charged with concentrated sulfuric acid and petroleum so that the sulfuric acid occupies the space between the lines $y$ and $z$ and the petroleum the space between the lines $y$ and $x$. The chlorin gas which must be thoroughly well dried, is introduced through the pipe $g$ which extends into the vessel A and is provided with a lift valve $i$ and above this lift-valve is a passage, leading into a chamber $m$ above and closed by a lift-valve $k$. The chamber $m$ is provided with a gage-glass $e$. The vessel B is enlarged by the part $y$ where the sulfuric acid and the petroleum meet so as to diminish the perpendicular movement of the liquid and prevent the formation of an emulsion. The upper part of the vessel B is furnished with a forcing device or plunger D, so that when the plunger is raised, the sulfuric acid contained in the space between the two valves $i$ and $k$ descends below the level of the inlet valve $i$ and the chlorin gas passes up through the pipe $g$ and fills the space between the valve $i$ and the valve $k$. When the plunger D is forced down, the valve $i$ closes and as the sulfuric acid rises in the chamber A, the chlorin gas is forced through the valve $k$ into the chamber $m$ from which it passes through the pipe $f$ and the cooler K into the receiver L. As the chlorin gas is forced forward by the sulfuric acid in chamber A it is forced through the warm sulfuric acid contained in chamber $m$ which acts to purify it and to hold back moisture and foreign substances with which it may be contaminated, and which unless held back, would tend to destroy the useful qualities of my product. The valve $k$ is depressed upon its seat by the expansive force of the liquid or fluid contained in the chamber $m$ and after a few strokes of the plunger D the pressure in this chamber retains said valve in its seat with the required force to insure the liquefaction of the chlorin gas.

It is of advantage to maintain the vessel or chamber A at a temperature of from 50° to 100° centigrade during the operation, and for this purpose a jacket $A^2$ is provided which can be charged with hot water or other heating medium. Should liquid or gaseous chlorin remain in the chamber A below the valve $k$ at the end of the depression of the plunger D, the said chlorin would on the pressure being relieved expand and fill a large portion of the void otherwise produced by the rise of plunger D thereby materially reducing the effect of the apparatus. To avoid this disadvantage I have provided a small passage $l$ controlled by a stop valve $p$ and made to extend from the chamber $m$ to the space between the valves $i$ and $k$. Whenever the pressure is relieved in this space, a small quantity of sulfuric acid passes through the passage $l$ from the chamber $m$ into the space above the valve $i$ and a somewhat smaller quantity of chlorin is drawn into this space than the quantity exactly corresponding to the displacement of the plunger D and consequently on the return stroke of the plunger not only all the chlorin is forced out but also a small quantity of sulfuric acid equivalent to that which previously passed down through the passage $l$. The valve $p$ is adjusted according to the position of the liquid in the chamber $m$.

The principal metals which are substantially unacted on by my liquid chlorin I have discovered to be wrought iron, cast iron, steel, brass and zinc. Lead, phosphor-bronze and especially copper, are according to my observations somewhat liable to attack and are therefore somewhat less suited than the above mentioned for use in my invention. Lead can sometimes be advantageously used for lining other vessels as it can readily be replaced and similarly phosphor-bronze and copper can be used for such parts of the apparatus as can readily be interchanged when desired. For example, the vessels A and B may be made of wrought iron, the receiver L of steel, the cooling worm or coil K of copper, the valves or cocks of phosphor-bronze, and lead, rubber or asbestus are employed for packing the flanges and the valve spindles.

For storing or transporting the liquefied chlorin the vessels are preferably made of iron or steel, either lined with lead, copper or brass or not.

The movable parts of the apparatus, which are in contact with the air may be protected from the action of the sulfuric acid by any suitable liquid, but preferably by means of a mineral oil, as hereinbefore explained such as petroleum, ligroin or melted paraffine and vaseline, which are not subject to decomposition when brought into contact with sulfuric acid. These liquids must be carefully purified with concentrated sulfuric acid before being placed in contact with the sulfuric acid in the apparatus.

The chlorin may be liquefied without the employment of an intermediate liquid, the pressure being transmitted directly through the sulfuric acid, but this is done at the expense of the apparatus.

Concentrated sulfuric acid acts successfully for the purpose of compressing and liquefying the chlorin gas since it is not attacked by the chlorin gas. Thus is avoided the possible production of moisture in the gas, resulting from the action of chlorin on a liquid containing oxygen and hydrogen which would cause it to attack and destroy metals; thus is also avoided the contamination of the gas with hydrochloric acid which would impair its value and greatly increase the pressure required for liquefying. For these reasons the employment of sulfuric acid as a medium for the application of the compression power is important to the product. I have also found that cold sulfuric acid absorbs chlorin under pressure like water does carbonic acid, and on relieving the pressure the gas is released just as the carbonic acid escapes from soda-water on the relief of pressure. This gas, at the back stroke of the piston would occupy the space below the valve to the exclusion of fresh gas. If the temperature of the sulfuric acid is maintained at from 50° to 100° centigrade, very little (if any) chlorin is absorbed by the acid during the operation of the apparatus and very little if any hydrochloric acid is formed.

It must further be remarked that I use mineral oil in combination with the sulfuric acid because ordinary lubricating oil would be decomposed by contact with the acid and at the same time this mineral oil serves to keep those parts of the apparatus which are periodically exposed to the air altogether away from the sulfuric acid. Traces of sulfuric acid borne on said parts, would absorb moisture and then attack the metals.

The liquid chlorin obtained by my process is of a brownish-yellow and boils at a temperature of about minus thirty-two ($-32°$) degrees centigrade (spirit thermometer) at a pressure of about seven hundred and fifty-six millimeters. Its specific gravity at that temperature is about 1.56 and at $0°$ centigrade it is about 1.47. At the temperature of $-15°$ to $-20°$, the specific gravity is 1.43 to 1.41.

Experimenting in the laboratory according to the descriptions in chemical literature, it was possible to produce a liquid chlorin contaminated in some cases with water, in some with air or organic compounds, &c., incapacitating it for being kept, except in small quantities, in small glass apparatus which was always in danger of breaking or bursting and incapacitating it for use excepting by experienced chemists.

My process substantially excludes contamination. Moisture obtained from the hydrochloric acid used in preparing the chlorin which might possibly be present, would be absorbed by the sulfuric acid in the machine, and by the use of sulfuric acid the production of moisture in the machine as above mentioned is rendered impossible. Other impurities in the chlorin gas used, such as those which arise from the presence of organic matter in the manganese dioxid used, would be held back by the warm sulfuric acid. Therefore, when practiced under the best conditions, my invention involves freedom from these contaminations. But I do not desire to limit myself strictly to absolute freedom from them, since it is possible that one or more of them may exist to some extent without incapacitating the product so far as concerns its practical capacity of being kept in metallic vessels as explained.

The metals to which I refer as capable of containing my liquid chlorin are as explained principally, iron, copper, zinc or lead.

What I claim as new, and desire to secure by Letters Patent, is—

As a new article, a merchantable package of liquid chlorin the same consisting of liquid chlorin inclosed in an iron or steel vessel and sufficiently anhydrous not to attack the iron or steel of the vessel constituting the container in which it is confined, as described.

In testimony whereof I have hereunto set my hand in the presence of two subscribing witnesses.

RUDOLPH KNIETSCH.

Witnesses:
ERNEST F. EHRHARDT,
CARL KLOTZ.